United States Patent [19]

Imamichi

[11] Patent Number: 4,546,240

[45] Date of Patent: Oct. 8, 1985

[54] SYSTEM FOR PERFORMING TRANSACTIONS

[75] Inventor: Tutomu Imamichi, Shiga, Japan

[73] Assignee: Omron Tateisi Electronics Co., Kyoto, Japan

[21] Appl. No.: 442,976

[22] Filed: Nov. 19, 1982

[30] Foreign Application Priority Data

Nov. 20, 1981 [JP] Japan ............................ 56-187453

[51] Int. Cl.[4] ........................................ G06F 15/30

[52] U.S. Cl. ............................................ 235/379

[58] Field of Search ................................ 235/379

[56] References Cited

U.S. PATENT DOCUMENTS 4,225,779 9/1980 Sano ................................ 235/379

4,355,369 10/1982 Garvin ............................ 235/379

FOREIGN PATENT DOCUMENTS 1415162 11/1975 United Kingdom .

1556491 11/1979 United Kingdom .

*Primary Examiner*—Harold I. Pitts

*Attorney, Agent, or Firm*—Stevens, Davis, Miller & Mosher

[57] ABSTRACT

A transaction performing system including a plurality of terminal units each of which comprises a cash handling device of the circulation type having cash containers for accommodating received cash as classified according to the kind of money and delivering cash from the containers for dispensing, and sensors for detecting the level of cash in each container. The transaction modes of the terminal unit include a receiving-delivery mode, a receiving-only mode and a delivery-only mode. When the amount of cash in one of the containers within one or more of the terminal units has increased to a predetermined level, the transaction mode of one or more of the other terminal units is changed from the receiving-delivery mode to the receiving-only mode. When the amount of cash in one of the containers within one or more of the terminal units has reduced to a predetermined level, the transaction mode of one or more of the other terminal units is changed from the receiving-delivery mode to the delivery-only mode.

10 Claims, 20 Drawing Figures

FIG. 16

WELCOME TO XXX BANK!
PRESS A KEY FOR YOUR SERVICE

THIS UNIT IS NOW IN DEPOSIT
SERVICE ONLY

FOR PAYMENT SERVICE, USE NO.3 UNIT

SYSTEM FOR PERFORMING TRANSACTIONS

BACKGROUND OF THE INVENTION

The present invention relates to a system for performing transactions which is useful for banking business and like financial business and which comprises a plurality of terminal units for executing depositing and payment transactions, and more particularly to such a transaction performing system wherein each of the terminal units has a cash handling device of the circulation type for accommodating the cash received for deposits in cash containers as individually classified according to the kind of money and for delivering cash from the containers for payment transactions.

Conventional transaction terminal units having a cash handling device of the circulation type are unable to execute continued transaction processing and are therefore brought out of operation when at least one container has been filled with cash or becomes almost empty. In such an event, the clerk collects the cash or replenishes the container with cash, and the operation of the unit is thereafter resumed. Without such intervention by the clerk, the terminal unit fails to operate smoothly, and is inconvenient, while the unit is not fully serviceable for customers because of an interruption of the operation.

Such a problem also arises when a branch is equipped with a plurality of transaction terminal units, because the units are operated or controlled each individually. Even when one of the terminal units is not in condition for processing transactions, customers can of course execute transactions with other units, but since such a branch has a large number of customers, it is likely that customers will concentrate on one unit for payment transactions, with others concentrating on another unit for depositing, with the resulting likelihood that the terminal units will be brought out of transaction services early. Thus although more than one unit is available, difficulties are encountered in the efficient use of the units.

SUMMARY OF THE INVENTION

An object of this invention is to provide a transaction performing system having a plurality of transaction terminal units as installed in the same branch or in proximity to one another which system is adapted for an efficient operation with minimized intervention by the clerk.

The transaction performing system of this invention comprises terminal units each including a cash handling device of the circulation type having cash containers for accommodating received cash as classified according to the kind of money and delivering cash from the containers for dispensing, and means for detecting the condition of cash in each of the containers. Further the system has means for controlling the transaction mode of one or more of the terminal units in accordance with the condition of cash in one or more of the other terminal units. The control means may be provided in each of the terminal units or in a centralized monitor-control unit for controling the terminal units.

The transaction modes of the present system includes a cash receiving-delivery mode, a cash receiving (receiving-only) mode, and a cash delivery (delivery-only) mode. When the cash in the cash handling device of a certain terminal unit in the receiving-delivery mode has increased greatly to present difficulty in cash receiving processing, another terminal unit in the normal state is changed over from the receiving-delivery mode to the receiving-only mode. Further when the cash in a certain terminal unit is low and presents difficulty in cash delivery processing, another normal terminal unit is changed to the delivery-only mode. Accordingly customers can be always guided to a terminal unit which is in condition for processing transactions, in accordance with the condition of cash in one or more of the other units, so that the plurality of terminal units can be operated efficiently without intervention by the clerk. Further because the terminal unit with a large amount of or scanty cash is returned to the proper state by suitably guiding customers, the unit can be in continued operation for executing transactions.

The present invention will become more apparent from the following description of embodiments with reference to the accompanying drawings.

BRIEF DESCRIPTION OF THE DRAWINGS

FIG. 16 shows an example of a display on a CRT included in the terminal;

DESCRIPTION OF THE PREFERRED EMBODIMENTS

Figure 1:
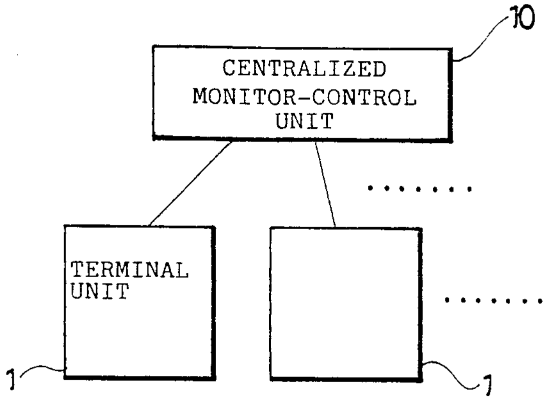
FIG. 1 is a block diagram showing the overall construction of a transaction performing system for illustrative purposes.

FIG. 1 shows a transaction performing system in its entirety. The system comprises a plurality of transaction terminal units 1, a centralized monitor-control unit 10 for controlling at least the transaction mode of these units 1, and a control center (not shown). The terminal units 1 are designated by numerals, as by No. 1, No. 2, . . . . These unit 1 are installed in the same branch of the bank or the like, or in proximity to one another. The units 1 are connected to the monitor-control unit 10 by transmission lines.

Figure 2:
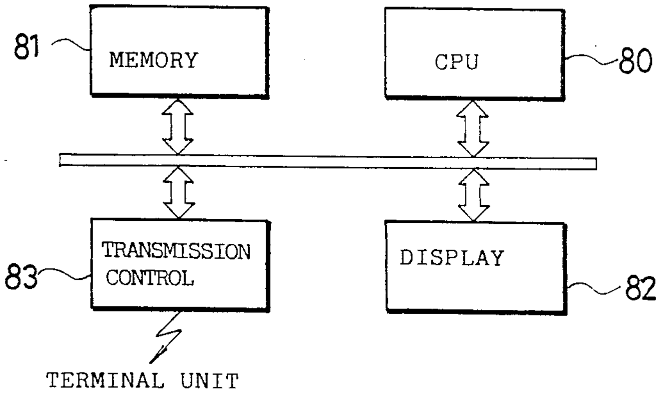
FIG. 2 is a block diagram showing the construction of an example of centralized monitor-control unit.

FIG. 2 shows the interior construction of the centralized monitor-control unit 10. The unit 10 is controlled by a CPU 80, and includes a memory 81 storing an execution program and data for controlling the transaction mode of each terminal unit 1, a display 82 for showing the transaction mode of each terminal unit 1 and the conditions of the cash containers to be described later, and a transmission control 83 for communicating with the terminals 1.

Figure 3:
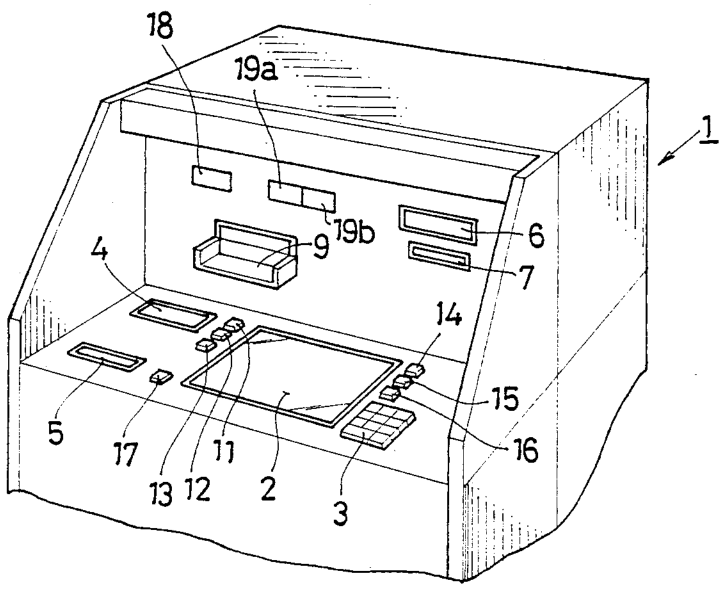
FIG. 3 is a perspective view showing the appearance of an example of a terminal unit.

FIG. 3 shows the appearance of the terminal unit, which is adapted to perform payment, depositing and other transactions. The terminal unit 1 has a forwardly projecting horizontal control panel which is provided with a cathode-ray tube (hereinafter referred to as "CRT") 2 for showing manipulation instructions for the customer, the functions of function buttons 11 to 17, the sum to be paid and other input data, and other information to be given to the customer. Arranged on opposite sides of the CRT 2 adjacent thereto are the functional buttons 11 to 13, 17 and 14 to 16 in vertical rows. These functional buttons 11 to 17 are used for the selection of the kind of transaction, cancellation and confirmation and the unit of amount of money, etc. to enter the inputs therefor. A ten-key arrangement 3 is arranged at the right front corner of the panel for keying in the secret number identifying a customer, the sum to be paid, etc. The panel further has a bill inlet 4 for inserting bills in depositing transactions, and a bill outlet 5 for discharging bills for payment transactions and also for returning bills when the bills are inserted for a depositing transaction, but a cancelling input is thereafter given.

The terminal unit 1 has a vertical control panel which is formed at the right side thereof with a a card inlet 6 for a magnetic card having magnetically recorded therein the personal code (such as secret number, account number, etc.) of a customer eligible for banking transactions, and also with an outlet 7 for discharging a receipt having transaction data printed thereon and issued when a transaction is performed without using a bank book. A bank book inlet 9 is formed in the panel at a left portion thereof. Provided above the bank book inlet 9 are an operation indicator 18 for showing that the terminal unit 1 is in condition for transactions, and a transaction mode indicator comprising two pilot lamps 19*a*, 19*b* for showing the kinds of transaction that can be executed. The operation modes of the terminal unit 1 are a receiving-only mode in which depositing transactions only are performed, a delivery-only mode for carrying out payment transactions only, and a receiving-delivery mode in which both depositing and payment transactions can be performed. The pilot lamp 19*a* only is on when the unit is in receiving-only mode, the pilot lamp 19*b* only is on when it is in delivery-only mode, and both the lamps 19*a*, 19*b* are on for receiving-delivery mode.

Figure 4:
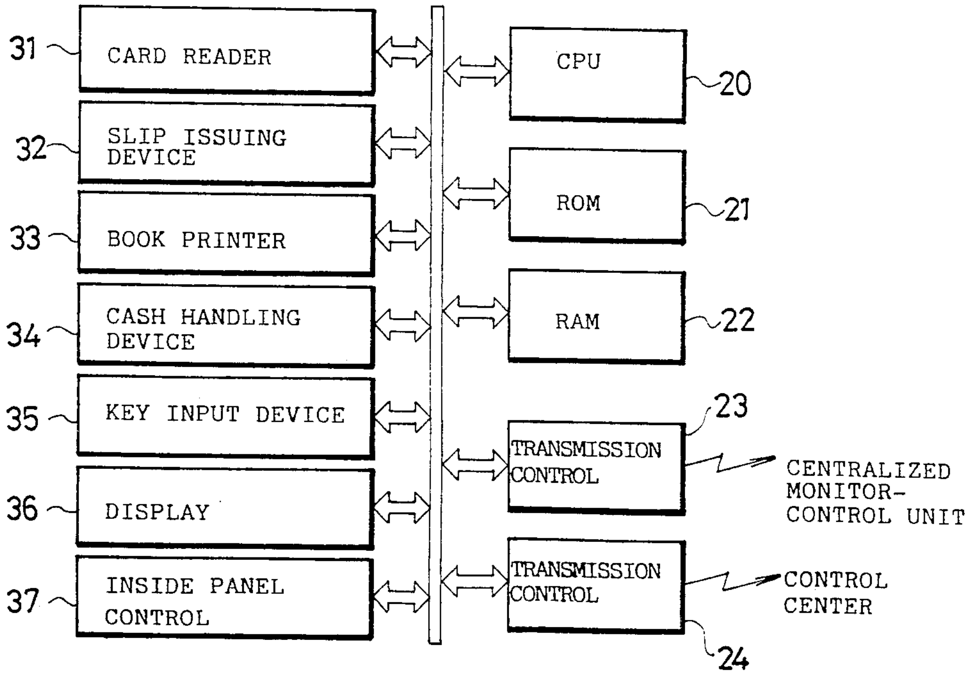
FIG. 4 is a block diagram showing the construction of the terminal unit.

FIG. 4 shows the interior construction of the terminal unit, which is controlled by a CPU 20. The CPU 20 has a card reader 31 provided inside the card inlet 6 for reading the data recorded in the magnetic card, a slip issuing device 32 for recording the kind of transaction, sum of payment or deposit and other transaction data for the bank and issuing a slip or receipt to the customer, a bank book printer 33 for printing such data on the bank book, a cash handling device 34 of the circulation type for receiving bills upon checking for depositing transactions and for delivering bills in the sum of payment for payment transactions, a key input device 35 including the function buttons 11 to 17 and the ten-key arrangement 3, display means 36 including the CRT 2, operation indicator 18 and transaction mode indicators 19*a*, 19*b*, and a control 37 on an unillustrated inside panel for monitoring and operating the terminal unit. A master CPU may be used as the CPU 20, with a slave CPU provided for controlling each of the input and output devices 31 to 37, so as to control the terminal 1 with a master slave system. The CPU 20 has a ROM 21 having its program stored therein and a RAM 22 for storing the transaction data and other data. The CPU 20 conducts communications with the control center through a transmission control 24 to execute various transactions under the instructions from the center. The CPU 20 further makes communications with the centralized monitor-control unit 10 through a transmission control 23, as will be described later.

Figure 5:
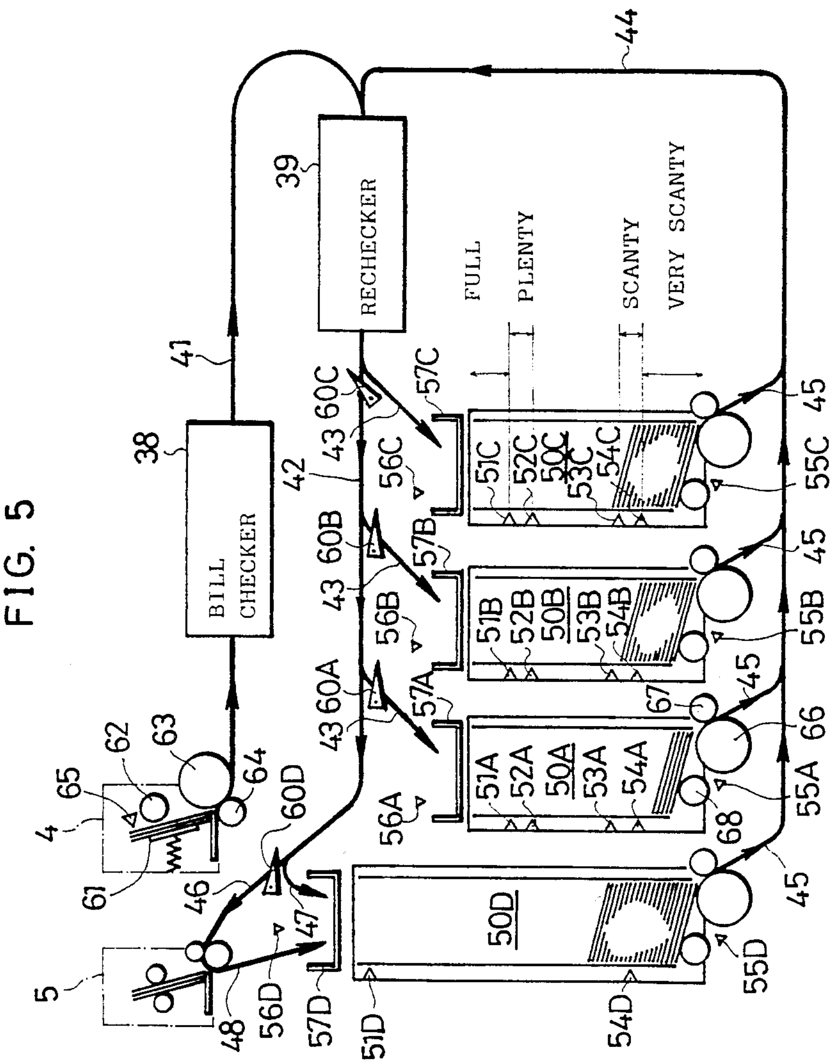
FIG. 5 schematically shows the construction of a cash handling device of the circulation type.

FIG. 5 shows the construction of the cash handling device 34 of the circulation type. The present embodiment uses three kinds of bills, e.g., $1, $5 and $10 bills, which will be indicated at A, B and C respectively. The device 34 has bill containers 50A, 50B and 50C for accommodating bills as classified according to the kind of bill and a combined bill container 50D. The bill containers 50A to 50C are fixed in position for storing bills A to C, respectively. The bill container 50D accommodates bills together irrespective of the kind of bill and is removable for replenishment and collection of cash. For the accommodation of bills, the container 50D has about 3 times the capacity of the containers 50A to 50C. Unless otherwise mentioned, the containers 50A to 50D, sensors provided within these containers, bill retainers associated with the containers and switching flappers will be referred to collectively without using the adscript characters A to D in the following description.

Each container 50 is provided thereabove with a bill retainer 57 having unillustrated means by which the bills temporarily held in the retainer are sent into the container 50 below. The retainer 57 further has a sensor 56 for detecting the absence or present of bills temporarily held therein. The container 50 has in its interior a full sensor 51, a plenty sensor 52, a scanty sensor 53, a very scanty sensor 54 and an empty sensor 55 as arranged in this order downward. These sensors, the sensor 56 for the retainer 57 and the sensor 65, to be described below, for the inlet 4 are all photoelectric sensors. When bills are detected by the sensor 51, the container concerned is interpreted as being full of bills. When bills are detected by the sensor 52 with no bills detected by the sensor 51, it is interpreted as containing plenty of bills. The container is interpreted as containing a scanty amount of bills when bills are detected by the sensor 54 with no bill detected by the sensor 53. Bills are very scanty when no bill is detected by the sensor 54 (with bills detected by the sensor 55). Even if the container is full, it has sufficient room for accommodating the bills to be received for at least one depositing transaction. Similarly even if very scanty, the amount of bills remaining in the container 50 is not smaller than the amount to be dispensed for at least one payment transaction. The combined container 50D is provided with a full sensor 51D, a very scanty sensor 54D and an empty sensor 55D.

Each container 50 has at its bottom a bill delivering means, which comprises an eccentric roller 68 for separating off the lowermost bill of a stack of bills, a dispenser roller 66 and a friction roller 67 in pressing contact therewith. The bills in the container 50 are delivered therefrom one by one.

The bill inlet 4 is also provided with bill delivering means comprising an eccentric roller 62, a dispenser roller 63 and a friction roller 64. When bills are inserted into the inlet 4, a bill holding plate 61 provided inside the inlet 4 advances to hold the bills between the plate 61 and the eccentric roller 62, and the bills are thereafter sent forward one by one. The bills are sent into a separating path 42 by way of an inlet path 41. The path 41 is provided at an intermediate portion with a bill checker 38 for checking the bills for kind and genuineness.

Three storing paths 43 branching off from the separating path 42 extend toward the retainers 57 for the containers 50. At the locations of the separating path 42 where the storing paths 43 are branched, switch flappers 60A to 60C are provided individually, which are controlled by the checking results of the checker 38 which identifies the kind of bills. For example, when bills are detected as the kind C by the device 38, the corresponding flapper 60C is moved to block the separating path 42 to send the bills to the retainer 57C. The bills temporarily held in the retainer 57 are placed into the container 50 upon the completion of the transaction concerned or the transaction for the next customer is to be initiated.

The separating path 42 extends toward the bill outlet 5 into an outlet path 46, at an intermediate portion of which a storing path 47 is branched off. The path 47 extends into the retainer 57D. A switch flapper 60D is provided also at the branched portion. A return path 48 extends from the outlet 5 to the retainer 57D. The bill or bills included in the bills received and found to be not genuine by the checker 38 are sent by way of the separating path 42 to the outlet path 46, from which the bills are sent to the outlet 5.

A delivery path 45 extends from the delivery means for each container 50 and is connected to a transport path 44, which is further connected to the separating path 42. In the vicinity of the junction, a bill rechecker 39 is disposed. In payment transactions, the bills corresponding to the sum of payment are dispensed from the containers 50A to 50C one by one and sent via the delivery paths 45 and transport path 44 to the rechecker 39, in which the bills are rechecked for kind and genuineness. The bills are then sent to the outlet 5 via the separating path 42 and the outlet path 46. As the result of the checking by the rechecker 39, some bills may be found not to be genuine or out of match with the kind specified. In such an event, the bills are sent through the separating path 42 and storing path 47 to the retainer 57D and thereafter placed into the container 50D. If the payment transaction is cancelled after the bills to be delivered have been transferred to the outlet 5, the bills in the outlet 5 are collected in the retainer 57D via the return path 48. When the depositing transaction is cancelled after the bills received have been held in the retainer 57A, an amount of bills corresponding to the sum received are dispensed from the containers 50A to 50C and forwarded to the outlet 5 and returned.

The inlet path 41, separating path 42, storing paths 43, transport path 44, delivery paths 45, outlet path 46, storing path 47 and return path 48 comprise rollers arranged at suitable locations and belts reeved around the rollers. Although not shown, double transport sensors for detecting that at least two superposed bills have been forwarded, and abnormal length sensors for checking the bills forwarded or dispensed for length are disposed in the vicinity of the bill dispensing outlets of the inlet 4 and of the containers 50. Arranged at suitable locations in the paths 41 to 48 are bill passage sensors for checking a bill jam based on the time taken for the bill to travel from one passage sensor to another passage sensor which are spaced apart by a distance.

Figure 6:
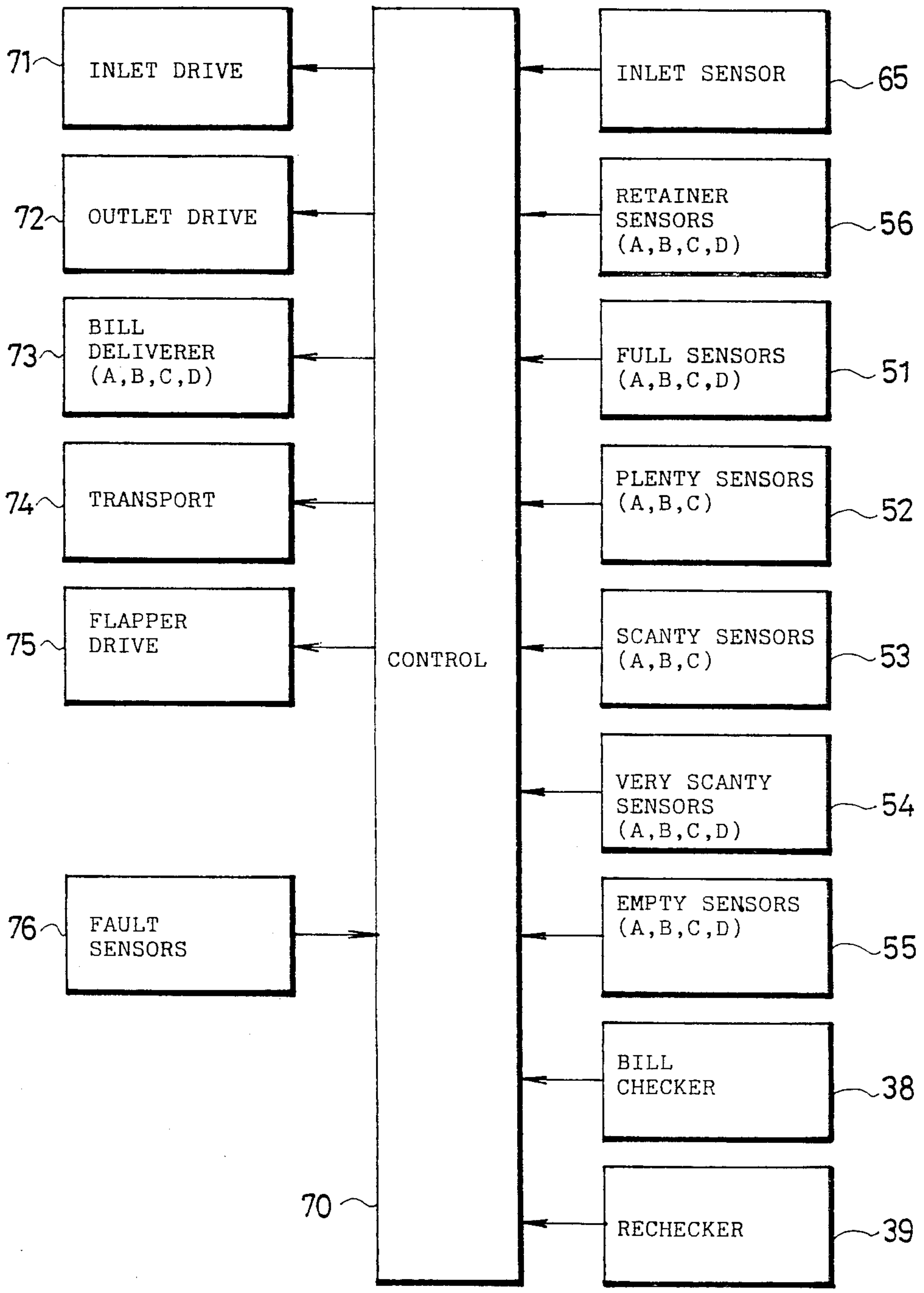
FIG. 6 is a block diagram showing the electric construction of the device.

FIG. 6 shows the electrical construction of the cash handling device 34. Preferably a control 70 comprises a CPU, a ROM having a program stored therein and a RAM for storing various items of data. Detecting or checking signals are fed to the control 70 from the sensors 65, 51 to 56, bill checker 38, rechecker 39 and fault sensors 76 such as double sensors. In response to these input signals and to instructions from the CPU 20 and in accordance with predetermined procedures, the control 70 controls inlet drive means 71 including the bill delivering means and shutter for the inlet 4, outlet drive means 72 including pinch rollers and shutter for the outlet 5, bill delivery means 73 for the containers 50, drive means 74 for the transfer paths 41 to 48, and drive means 75 for the switch flappers 60.

Figure 7:
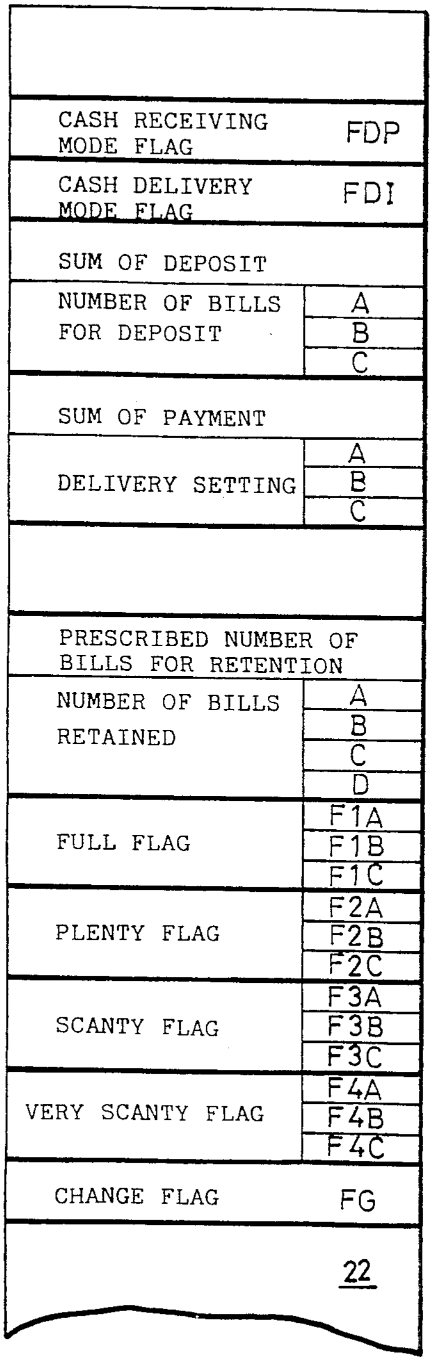
FIG. 7 shows part of the contents of a RAM in the terminal unit.

FIG. 7 shows part of the contents of the RAM 22 included in the terminal 1. The RAM 22 includes areas for use as a receiving mode flag FDP and a delivery mode flag FDI, an area for storing the sum of a deposit, an area for storing the number of each kind of bills received for the deposit, an area for storing the sum to be paid and keyed-in, an area for setting the number of bills of each kind to be delivered for payment as requested, an area for storing the maximum number of bills, M, to be temporarily held in the retainer 57 for each container 50, an area for storing the number of bills held in each retainer 57, areas for use as flags F1A to F4C for storing the conditions of the containers 50A to 50C as to whether bills are placed in to the full, are plenty, scanty or very scanty, and an area for use as a change flag FG. The flag FDP only changes to 1 for the receiving-only mode, FDI only to 1 for the delivery-only mode, and both FDP and FDI to 1 for the receiving-delivery mode. The flags F1A to F4C are set to 1 when the cash in the containers 50A to 50C is to the full, plenty, scanty and very scanty, respectively. The change flag FG is set to 1 upon the change of the receiving-delivery mode to the receiving-only or delivery-only mode by the instructions from the centralized monitor-control unit 10.

Figure 8:
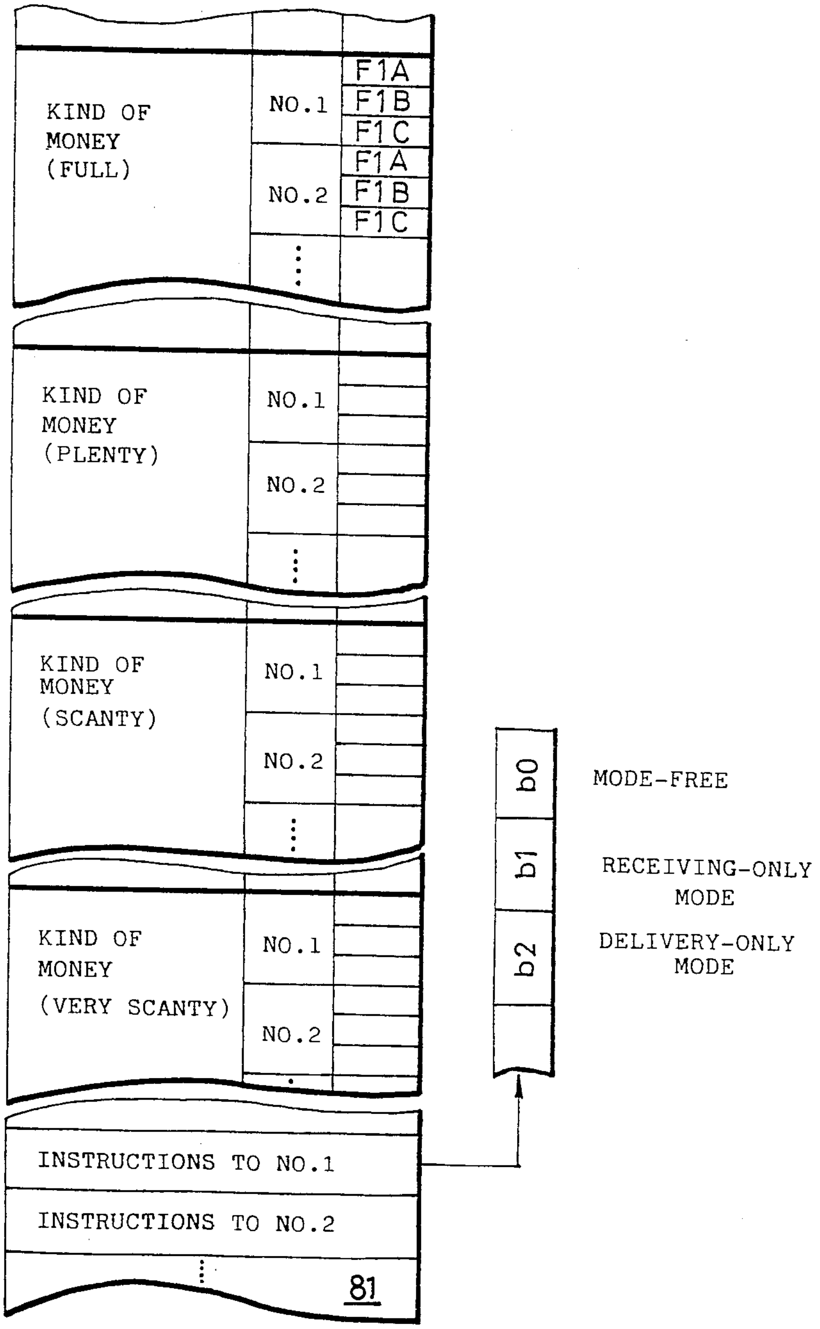
FIG. 8 shows part of the contents of a RAM in the centrilized monitor-control unit.

FIG. 8 shows part of the contents of the memory 81 of the monitor-control unit 10. For each terminal unit 1, the memory 81 has areas for storing the kinds of money which are "full", plenty, scanty and very scanty as by flags F1A to F4C, and areas for preparing instructions to each terminal unit 1. The instructions to the unit 1 includes mode-free, receiving-only and delivery-only instructions. One of bits b0 to b2 is set to 1.

Figure 9:
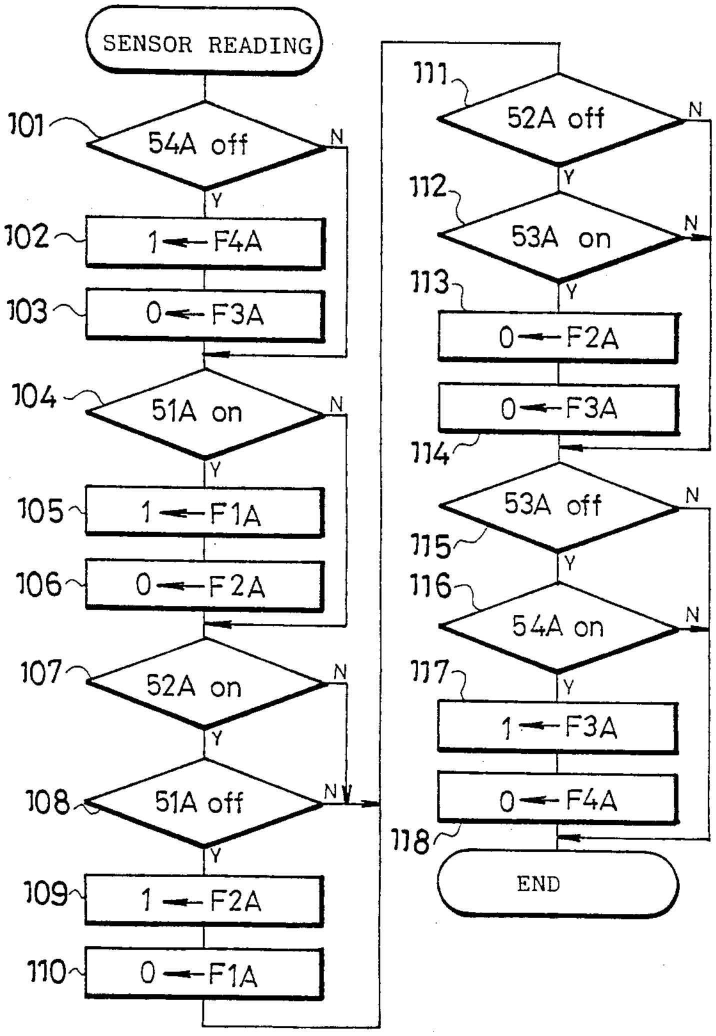
FIG. 9 is a flow chart showing a sensor reading process.

FIG. 9 shows a sensor reading process in detail for the sensors of the container 50A only. Similar processes are of course executed for the sensors of the other containers 50B and 50C. First the output signal from the very scanty sensor 54A is read (step 101). If it is off (no bills detected), the very scanty flag F4A is set to 1 (step 102), and the scanty flag F3A is reset to 0 (step 103). When the sensor 54A is on (bills detected), no process is executed. Next, the full sensor 51A is checked (step 104). If it is on, the full flag F1A is set to 1 (step 105), and the plenty flag F2A is reset to 0 (step 106). When the plenty sensor 52 is on, with the full sensor 51A off (step 107, 108), the uppermost bill is positioned between the two sensors 52A and 51A and a plenty of cash is present, so that the plenty flag F2A is set to 1 (step 109), and the full flag F1A is reset to 0 (step 110). When the plenty of bills in the container 50A decreases or the amount of bills increases from "scanty", the sensor 52A is off (step 111) with the sensor 53A on (step 112). The condition is no longer plenty or scanty, so that the flags F2A and F3A are reset to 0 (steps 113, 114). If the sensor 53A is off (step 115), with the sensor 54A on (step 116), this indicates "scanty", so that the scanty flag F3A is set to 1 (step 117), and the very scanty flag F4A is reset to 0 (step 118).

With the present embodiment, the terminal unit 1 informs the centralized monitor-control unit 10 of the condition of bills in the container as to whether it is full, plenty, scanty, very scanty or none of these conditions, and the information is stored in the memory 81. The unit 10 checks the contents of the memory 81 and gives necessary instructions to the terminal 1. When the mode-free instructions are given, the terminal unit 1 is allowed to determine the transaction mode by itself for its own reason. In thise case, the unit 1 generally becomes the receiving-delivery mode but, sometimes, may assume the receiving-only or delivery-only mode. For example, when the bank is in short of the payment fund and does not wish to make payments, the unit will be set in the receiving-only mode. Further if the depositing service time is over, the unit will be set in the delivery-only mode. Such mode setting is done by the clerk with use of the inside panel.

When instructions are given for the receiving-only mode, as well as for the delivery-only mode, the unit 1 is changed over to that mode forcibly, only when in the receiving-delivery mode. If the unit 1 is in the receiving-only mode when instructions for the receiving-only mode are given, there is no need to change the mode. When in the delivery-only mode, the unit has good reason to be unable to receive cash, so that the mode will not be changed. Conversely if the unit is in the delivery-only mode when instructions are given for the delivery-only mode, there is no need to change the mode. When in the receiving-only mode, the terminal has some reason for being unable to dispense cash, hence no mode change.

When at least one of the containers 50A to 50C of a certain terminal unit 1 has become full or nearly full (plenty), the monitor-control unit 10 gives another terminal 1 instructions for a change to the receiving-only mode, with the result that customers intending to perform deposit transactions will concentrate on the latter terminal unit 1. Customers for payment transactions will concentrate on the former terminal unit 1 to promptly solve the full or nearly full condition of that unit. Further when the cash in at least one of the containers 50A to 50C of a certain terminal unit 1 has become scanty or very scanty, the unit 10 gives another terminal unit 1 instructions for a change to the delivery-only mode, with the result that customers intending to perform payment transactions will concentrate on the latter terminal 1. Customers for depositing transactions will concentrate on the former unit 1 to promptly solve the scanty or very scanty condition of that unit.

Figure 10:
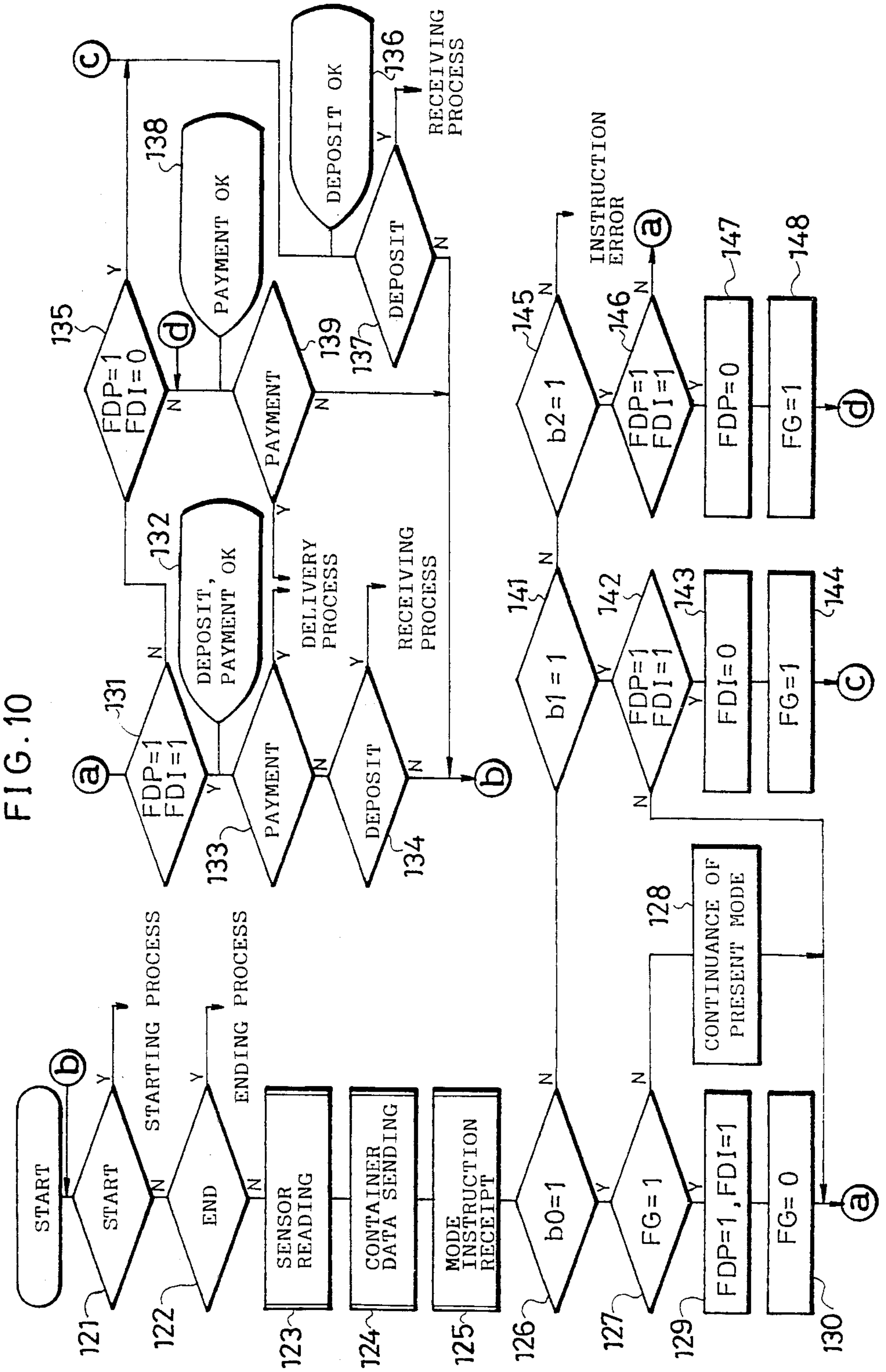
FIG. 10 is a flow chart showing the overall operation of the terminal unit including a mode change process.

FIG. 10 shows the overall operation of the terminal unit 1, which has a service start switch and service ending switch on the inside panel. When these switches are turned on (steps 121, 122), the start and ending processes to be described later will be executed. On completion of these processes, the sequence returns to "start" again. If there is no need for the start or ending process, the sensor reading process (FIG. 9) is executed (step 123). Subsequently the data as to the cash in the containers 50A to 50C and the existing transaction mode stored in the RAM 22 is transmitted to the monitor-control unit 10 (step 124).

Upon receipt of the instructions on the mode from the unit 10 (step 125), the instructions are read. When the mode-free instructions are given with b0=1 (step 126), the change flag FG is checked (step 127). If FG=0, the unit has not been forced to change its mode by the unit 10 and therefore remains in the existing mode (step 128). If FG=1, the unit 1 has been forcibly changed to the receiving-only or delivery-only mode by the monitor-control unit 10, so that the mode flags FDP and FDI are both set to 1 (step 129) to return the unit to the original receiving-delivery mode. The change flag FG is reset to 0 (step 130). The mode flags FDP and FDI are thereafter checked. If they are both 1, this indicates the receiving-delivery mode (step 131). Both pilot lamps 19*a*, 19*b* are turned on, indicating that the unit is in condition for depositing and payment transactions (step 132). In accordance with the kind of transaction selected by the customer, a depositing or payment transaction is processed (step 133, 134). When FDP=1 and FDI=0, the unit is in receiving-only mode (step 135), so that the pilot lamp 19*a* only is turned on, indicating that the unit is in condition for depositing transactions but not for payment (step 136). With reference to manipulation instructions on the CRT 2, the customer selects depositing with one of the function buttons 11 to 16 (step 137) for depositing. Even if payment is selected by one of the buttons 11 to 16, the selection input is null, and the sequence returns to "start". When steps 131 and 135 both prove "NO", this indicates the delivery-only mode. Accordingly the lamp 19*b* only goes on, indicating that the unit is in condition for payment but not for depositing (step 138). When the customer selects payment (step 139), a payment transaction is performed, whereas if depositing is selected, the sequence returns to "start" since this input is null.

When b0=0 is given by the unit 10 (NO for step 126), b1 and b2 are then checked. If b1=1, giving instructions for the receiving-only mode (step 141), the existing mode is checked as to whether it is the receiving-delivery mode (step 142). When the mode flags FDP and FDI are both 1, the delivery mode flag FDI is reset to 0 for a change to the receiving-only mode (step 143), and the change flag FG is set to 1 (step 144). The lamp 19*a* only is on, with the lamp 19*b* turned off (step 136). When the existing mode is not the receiving-delivery mode (NO for step 142), step 131 follows, and the existing transaction mode continues.

When b2=1, giving instructions for the delivery-only mode (step 145) and if the existing mode is receiving-delivery (step 146), the receiving mode flag FDP is reset to 0 for a change to the delivery-only mode (step 147). At the same time, the change flag FG is set to 1 (step 148). The lamp 19*b* only is on, with the lamp 19*a* turned off (step 138). If the existing mode is not receiving-delivery, step 131 follows.

The steps to be performed for starting and ending the service operation of the terminal unit 1 include charging and collection of bills. For starting, the combined container 50D filled with bills of the kinds A, B and C is set in position. On closing the service start switch, the bills in the container 50D are tranferred into the containers 50A to 50C as classified according to the kind of bill. When the ending switch is turned on for ending the service, the bills in the containers 50A to 50C are transferred to the combined container 50D, whereupon the clerk removes the container 50D to collect the bills.

Figure 11:
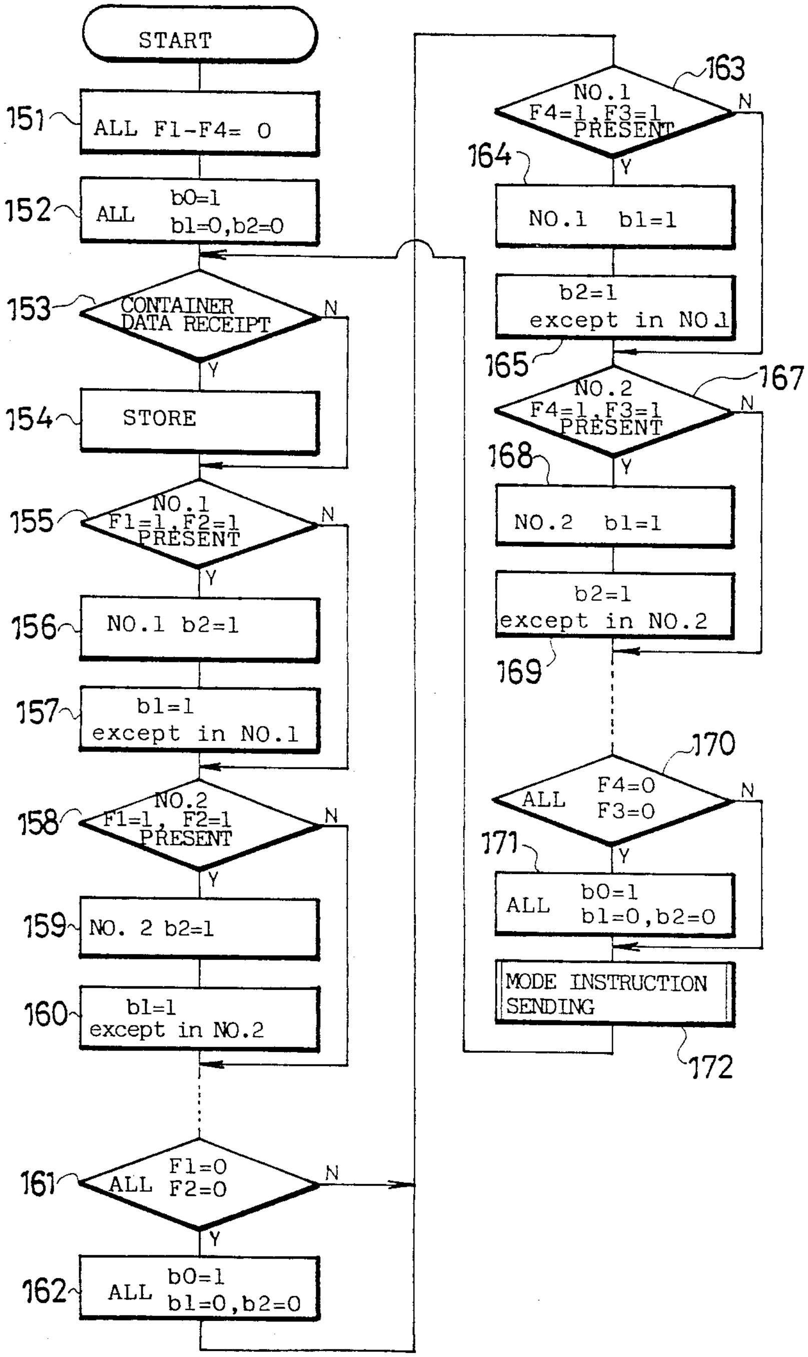
FIG. 11 is a flow chart showing the mode change control of the centralized monitor-control unit for terminal units.

FIG. 11 shows the process to be executed by by the centralized monitor-control unit 10 on condition that only one of the plurality of terminals will have the cash in its classifying container increased to the full or plenty amount or reduced to the scanty or very scanty amount, but the case is not considered wherein two or more terminals come into the above state. First, the area in the memory 81 for storing the condition of cash in the containers for each terminal unit is cleared (step 151), and b0 in the instruction preparing area is set to 1, with both b1 and b2 reset to 0 (step 152). Through this initial procedure, the instructions to all the terminals are set to mode-free.

When information as to the condition of bills in the classifying container is sent to one of the terminals (step 153), the information is stored in the memory 81 (step 154). First, No. 1 unit is checked as to whether one of its full flags F1 or plenty flags F2 is set to 1 (step 155). If there is a flag set to 1, this means one kind of cash in No. 1 unit is in the full or plenty amount, so that it is not desirable to allow the unit to remain in the receiving-delivery mode. Instructions for No. 1 unit are b2=1, b0,b1=0 (step 156), and for the other units are b1=1, b0,b2=0 (step 157), therefore. Thus instructions are given to No. 1 unit for delivery-only mode, and to the other terminals for the receiving-only mode. If all the full flags and plenty flags of the No. 1 unit are 0, no procedure is followed. Subsequently, the same procedure is followed for No. 2 unit and the other terminal units (steps 158 to 160). All the terminals are checked as to whether the full and plenty flags are all 0 (step 161). When all are 0, b0=1 and b1,b2=0 for all the terminal units, and the sequence returns to the initial state (step 162). When the terminal in the full or plenty condition returns to the normal state, step 161 is YES. The instructions to all the terminals are mode-free now.

Next, No. 1 unit is checked as to whether one of its scanty flags F3 or very scanty flags F4 is set to 1 (step 163). If there is a flag set to 1, one kind of cash in No. 1 unit is in the scanty or very scanty amount, so that it is not desirable to allow the unit to remain in the receiving-delivery mode. Accordingly the instructions for No. 1 unit are b1=0 and b0,b2=0 (step 164), and those for the other units are b2=1 and b0,b1=0 (step 165). Consequently instructions are given to No. 1 unit for the receiving-only mode, and to the other units for delivery-only mode. When all the scanty flags and very scanty flags of No. 1 unit are 0, no procedure is followed. Subsequently the same procedure is repeated for No. 2 unit and the other terminal units (steps 167 169). All the terminals are checked as to whether the scanty and very scanty flags are all 0 (step 170). If all are b0=1 and b1,b2=0 for all the terminals, and the sequence returns to the initial state (step 171). Since step 170 changes to YES when the terminal in the scanty or very scanty state returns to the normal state, the instructions to all the terminals are changed to mode-free. Finally the instructions in the instruction preparing area are given to the terminal unit from which the data as to the container was sent in step 153 and, when needed, to all the terminal units (step 172).

To adapt the process of FIG. 11 to the case wherein two or more terminal units reach the full or plenty condition at the same time, instructions with b1=1, and b0,b2=0 are prepared in steps 157 and 160 for the terminal units other than the units in the full or plenty condition. The same is true of the scanty or very scanty condition. In order to meet the situation wherein a terminal unit has reached the full or plenty condition with another unit in the scanty or very scanty condition, the plurality of terminal units may be divided into two groups in advance, such that when a terminal unit has reached the full or plenty condition, instructions for the receiving-only mode are given to one group, and that when a terminal unit has reached the scanty or very scanty condition, instructions for the delivery-only mode are given to the other group.

Although the foregoing embodiment is so adapted that when a terminal unit has reached the full or plenty state, the receiving-only mode instructions are given to another terminal unit, such instructions may be given only when the full condition has been reached. The same is true of the very scanty condition. In such a case, the following procedure is desirable: the full flage F1 is set to 1 upon the amount of bills in the container exceeding the level of the full sensor 51A as the amount increases, and the full flag F1 is reset to 0 upon the amount of bills, thereafter decreasing, reducing beyond the level of the plenty sensor 52A. This eliminates the likelihood that the flag F1 will change for every transaction. This is also the case with the very scanty flag.

With the foregoing embodiment, when one of the classifying containers has reached the full condition (also inclusive of the plenty condition) or the very scanty condition (inclusive of the scanty condition), the transaction mode of another terminal unit is immediately changed. However, when one or two of the containers have become full or very scanty, the following procedure can be followed for the terminal unit concerned. The customer may be so led as to insert bills of the kind other than those in the full container, with a limitation imposed on the kinds of bills to be used for depositing. The bills to be dispensed may be replaced by those in the containers which are not in the very scanty condition. The customer may be led to key-in a sum for payment which can be paid with bills of the type which is not very scanty. When all the classifying containers are full or in the very scanty condition, another terminal unit may be changed to a different transaction mode.

The combined container 50D, although unused in any way for payment transactions in the case of the above embodiment, can be used therefor. When the cash in one of the containers 50A to 50C has reduced to the very scanty or scanty condition, bills are dispensed from the container 50D and checked, and those of the kind concerned are supplied to that container for replenishment. When desired, other containers may be similarly replenished with bills. If the amount of cash still remains very scanty despite the replenishment, instructions to change the transaction mode are given. This serves to reduce the frequency with which the mode change instructions are provided. A similar procedure can be followed for depositing transactions.

When the amount of cash in a particular classifying container has reached the full or plenty condition, some of the cash is transferred to the combined container. When the two containers have become full, instructions are given to change the mode of another terminal unit.

Although bills only are used as cash in the foregoing embodiment, the invention is of course applicable to transaction terminal units for handling coins. Further the present invention is not limited to terminal units to be manipulated by customers but is also useful for cash handling devices installed at the counter for the teller. Although pilot lamps are illustrated as the transaction mode indicators, a CRT or some other display means are alternatively usable. In this case, the display may be disposed above the terminal unit so that the transaction mode of the unit can be recognized at a distance away from the unit. The cash classifying containers, although fixedly installed in the unit, can be made removable.

According to the embodiment described above, the mode of each terminal unit is changed in response to the instructions from the centralized monitor-control unit. However, the terminal unit can be adapted to determine its transaction mode by itself in accordance with the condition of bills within the classifying container of another terminal unit. Such an embodiment will be described below in detail.

Figure 12:
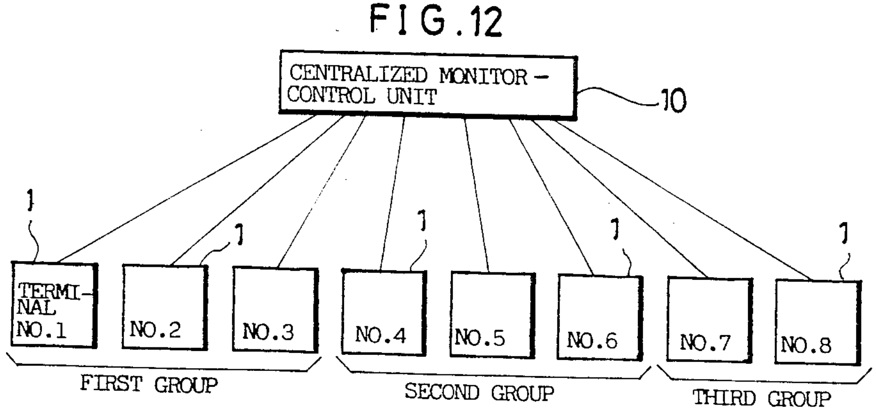
FIG. 12 is a block diagram showing another transaction performing system embodying the invention.

With reference to FIG. 12, the embodiment shown comprises eight terminal units 1 for convenience sake. These units 1 are divided into three groups: a first group of No. 1 to No. 3 units 1, a second group of No. 4 to No. 6 units 1, and a third group of No. 7 and No. 8 units 1. As will be described later, the transaction mode of each unit 1 is determined according to the condition of another unit 1 in the same group. The terminal units 1 and a centralized monitor-control unit 10 are of the same construction as those of the foegoing embodiment.

Figure 13:
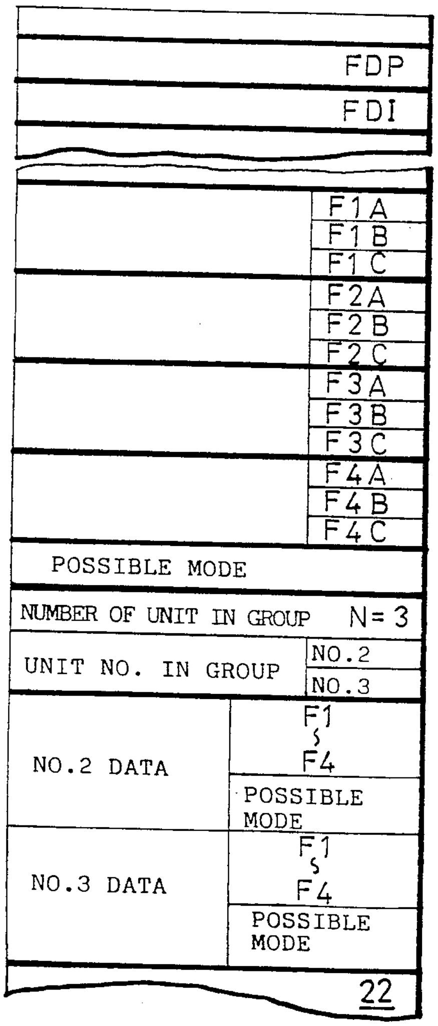
FIG. 13 shows another example of the contents of the RAM included in the terminal unit.

FIG. 13 shows part of the contents of the RAM 22 of the unit 1. The RAM 22 has in its interior an area (not shown) for storing transaction data, areas for use as a receiving mode flag FDP and a delivery mode flag FDI individually, and areas for use as flags F1A to F4C for storing the conditions of cash classifying containers 50A to 50C respectively. In addition, the RAM 22 has an area for storing the modes of transactions to be performed (illustrated as "possible modes"), an area for storing the number N of terminal units 1 (inclusive of the unit 1 concerned) in the same group, an area for storing the designation numbers of terminal units 1 (exclusive of the unit 1 concerned) in the same group, and areas for storing data as to the condition of bills in each other terminal unit 1 in the same group and the modes of transactions to be performed by the unit 1. The RAM 22 of No. 1 unit 1 is shown in FIG. 13. This unit belongs to the first group, which comprises three units 1, hence N is 3. The RAM has stored therein No. 2 and No. 3 as the designation numbers of the other terminal units in the same group, and data as to the conditions of bills in No. 2 and No. 3 units and the possible modes thereof. The designation numbers of the other units in the same group are set by the clerk, for example, with use of the inside panel.

The possible modes are set chiefly by the clerk. The inside panel of each unit 1 is provided with an unillustrated mode change switch, which is used by the clerk to set the possible mode according to the state of the unit. Usually the unit is set to the receiving-delivery mode. The unit is set to the receiving-only mode, for example, when the bill dispensing means of the cash handling device 34 of the circulation type is at fault, or when the bank is unwilling to make payments due to shortage of fund. The delivery-only mode is set in the event of malfunction of the bill checker 38 or upon the lapse of the depositing service time (for example, after 3 p.m.). The transaction mode set by the mode change switch on the inside panel is read by the process to be described later and stored in the possible mode storing area. The possible modes of No. 2 and No. 3 units are sent from the monitor-control unit 10 to No. 1 unit and stored in its RAM 22.

It is also possible for the terminal unit 1 itself to automatically change its mode according to the condition of bills in the classifying container 50 of the cash handling device 34. For example, when one of the containers 50A to 50C has reached the full or plenty condition in the receiving-delivery mode, the mode is changed to the delivery-only mode. Conversely if one of the containers has reached the very scanty or scanty condition, the mode is changed to the receiving-only mode. The possible mode is determined also by the result of this automatic mode change.

Figure 14:
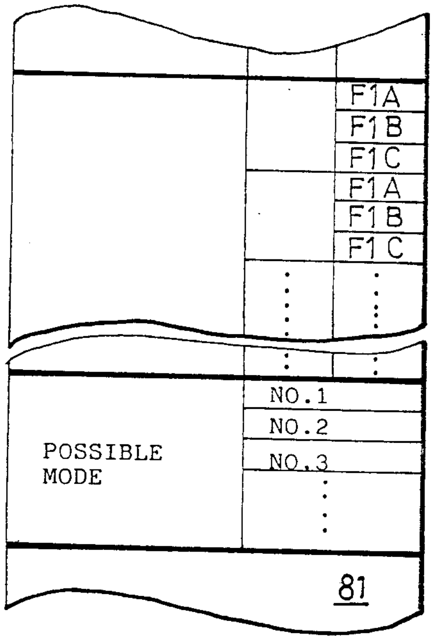
FIG. 14 shows another example of the contents of the RAM included in the centralized monitor-control unit.

FIG. 14 shows some contents of the memory 81 of the centralized monitor-control unit 10. The memory has areas for storing the kinds of money in full, plenty, scanty and very scanty amounts as by flags F1A to F1C for each unit 1, and an area for storing the possible mode of each terminal unit.

Figure 15A:
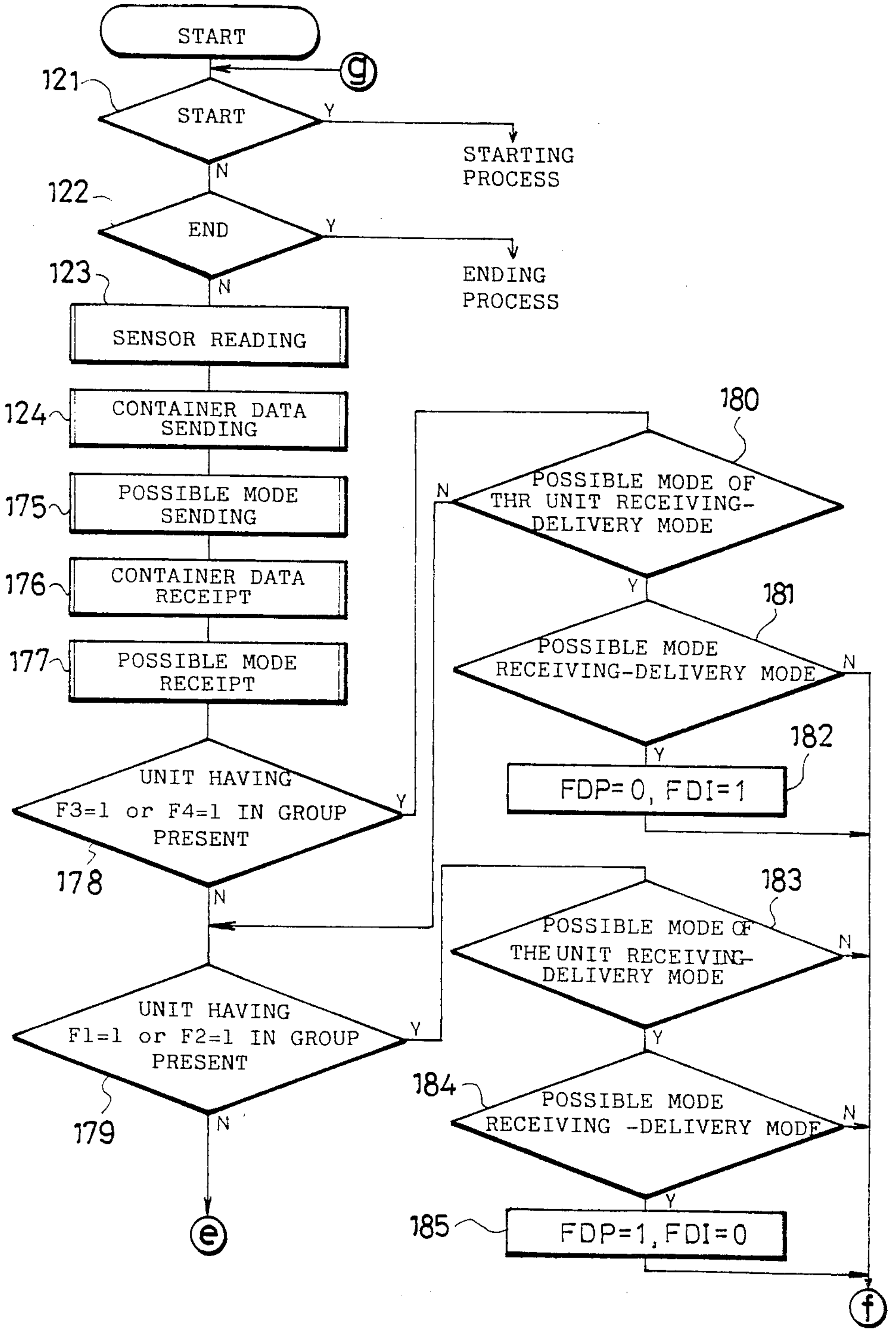
FIGS. 15*a* and 15*b* comprise a flow chart showing another example of the mode change process for the terminal unit.
Figure 15B:
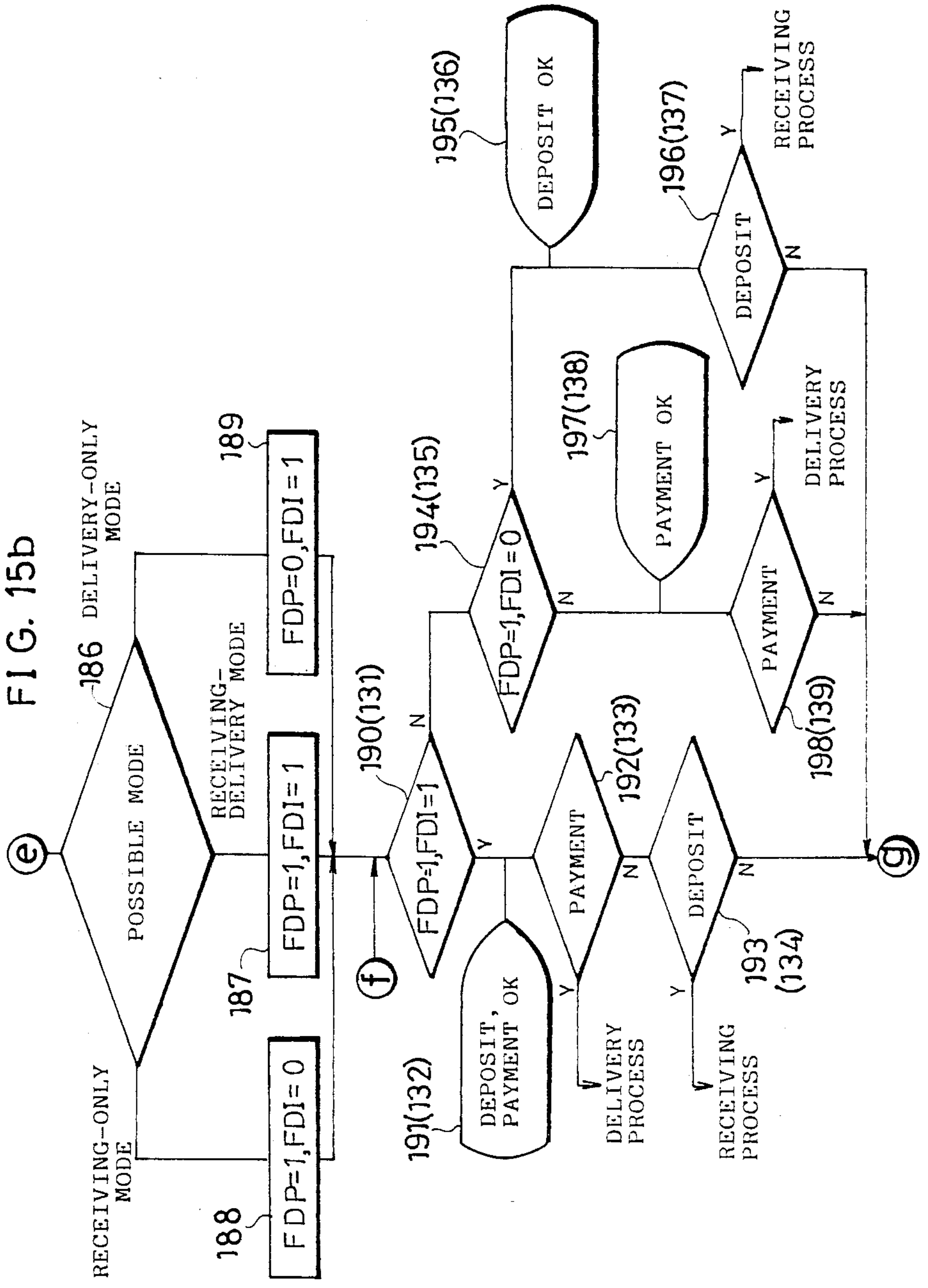

FIGS. 15*a* and 15*b* show the overall operation of the terminal unit. The operation is exactly the same as that already described (FIG. 10) with respect to the service start process, service ending process and sensor reading process (steps 121 to 123). After these processes, the information relating to the bills in each classifying container and stored in the RAM 22, and the possible mode are sent to the monitor-control unit 10 (steps 124, 175).

Upon receipt of data including the above-mentioned information and the possible mode from a particular terminal unit 1, the monitor-control unit 10 stores the data in the memory 81. The unit 10 edits items of data which relate to the condition of bills in the classifying container of each of other terminal units and to the possible mode thereof and which are stored in the memory 81, and sends the resulting data to that terminal unit. The data to be sent as to the condition of bills in the classifying container need not cover the states of the flags (such as F1A, F1B and F1C) representing the conditions of all kinds of money; if a terminal unit has some kind of money in the full or plenty amount, the data required as to that unit is one indicating that the unit has a kind of money in the full or plenty amount, or when some kind of money is in the very scanty or scanty amount, the data required as to the unit concerned is one indicating that the unit has a kind of money in the very scanty or scanty amount.

With reference to FIGS. 15*a* and 15*b*, when the unit 1 receives from the unit 10 the data relating to the container and the possible mode, the data is stored in the RAM 22 (steps 176, 177). The monitor-control unit 10 sends out data relating to all the other terminal unit, e.g., the unit 10 sends to No. 1 unit data relating to No. 2 to No. 8 units. However, No. 1 unit picks up only the items of data relating to the other units in the same group, i.e., the data relating to No. 1 and No. 2, and stores the data in the RAM 22.

With reference to the data stored in the RAM 22, the unit 1 checks whether or not there is in its group any terminal unit having scanty or very scanty money of some kind (step 178). If such a unit is found, step 180 checks whether the possible mode of that unit is the receiving-delivery mode. When it is this mode, the unit checks itself as to whether the possible mode thereof is the receiving-delivery mode (step 181). Only when the possible modes of the unit with scanty or very scanty money of some kind (hereinafter referred to as the "unit with scanty cash") and the unit in operation for the flow chart sequence (hereinafter referred to as the "unit in operation") are both the receiving-delivery mode, the unit in operation is changed to the delivery-only mode, with FDP=0 and FDI=1. The pilot lamp 19*b* only goes on, indicating that the unit is ready for payments but not for deposits (step 182). Consequently customers contemplating payment transactions will concentrate on the unit in operation, while customers for deposit transactions will concentrate on the unit with scanty cash, thereby promptly remedying the cash deficiency. If the possible mode of the unit with scanty cash is not the receiving-delivery mode, the mode of the unit in operation remains unchanged since a change to the delivery mode is then meaningless. This is due to the following reason. When the possible mode of the unit with scanty cash is the receiving-only mode, the unit operates in this mode, so that no problem arises, should some kind of money become scanty or very scanty (which is generally infeasible). If the possible mode is the delivery-only mode, the unit can not be in the receiving-delivery mode or receiving-only mode, hence it is impossible to remedy the scanty or very scanty condition. Further if the possible mode of the unit in operation is not the receiving-delivery mode but the delivery-only mode, there is no need for a mode change. If in the receiving-only mode, the unit in operation has reason not to be able to handle payments, hence no mode change.

If there is no unit with scanty cash in the same group (step 178, NO), step 179 checks whether there is a unit having cash of some kind in the full or plenty condition (hereinafter referred to as the "unit with full cash") in the same group. If the group includes such a unit, the unit in operation is changed to the receiving-only mode, with FDP=1 and FDI=0, provided that the possible modes of the unit with full cash and of the unit in operation are both the receiving-delivery mode (steps 183, 184). The pilot lamp 19*a* alone goes on (step 185).

If the same group includes neither a unit with scanty cash nor a unit with full cash (NO for step 179), step 186 checks the unit in operation for the possible mode. If it is the receiving-delivery mode, FDP and FDI are both set to 1 to set the unit in this mode, with both the pilot lamps 19*a*, 19*b* turned on (step 187). Thus the mode resulting from step 182 or 185 is changed to the initial receiving-delivery mode. Further if the possible mode of the unit in operation is the receiving-only mode, FDP=1 and FDI=0 (step 188), while if it is the delivery-only mode, FDP=0 and FDI=1 (step 189).

After the foregoing procedure, the unit executes the usual transaction process. First, the mode flags FDP and FDI are checked. When both are 1, this indicates the receiving-delivery mode (step 190), so that the CRT 2 shows that the unit is in condition for both deposit and payment transactions (step 191). A deposit or payment transaction is executed in accordance with the customer's selection (steps 192, 193). A further description will be omitted since these steps 190 to 198 are the same as steps 131 to 139 in FIG. 10 except that the transaction mode is shown on the CRT 2.

With the above embodiment, two to three terminal units are grouped into one, and the transaction mode of a particular unit in this group is changed according to the condition of bills in another terminal unit within the same group. Thus this arrangement is very useful. Suppose the eight terminals are not grouped and are adapted to change the mode with reference to one another. It is then likely that if a terminal unit has cash of some kind reduced to the scanty or very scanty amount, all the other seven terminal units will be set to the delivery-only mode. In any case, whether or not terminal units are to be grouped is determined according to the number of units to be installed in the same branch or in proximity to one another.

With any of the foregoing embodiments, the pilot lamps 19*a*, 19*b*, CRT 2 or some other display shows only the transaction mode of the terminal unit. However, when a certain terminal unit is in condition for only one type of transactions (e.g. in the receiving-only mode for deposits), it is desirable for the unit to display the designation number of another unit which is in condition for performing other transaction (e.g. payments).

Figure 16:
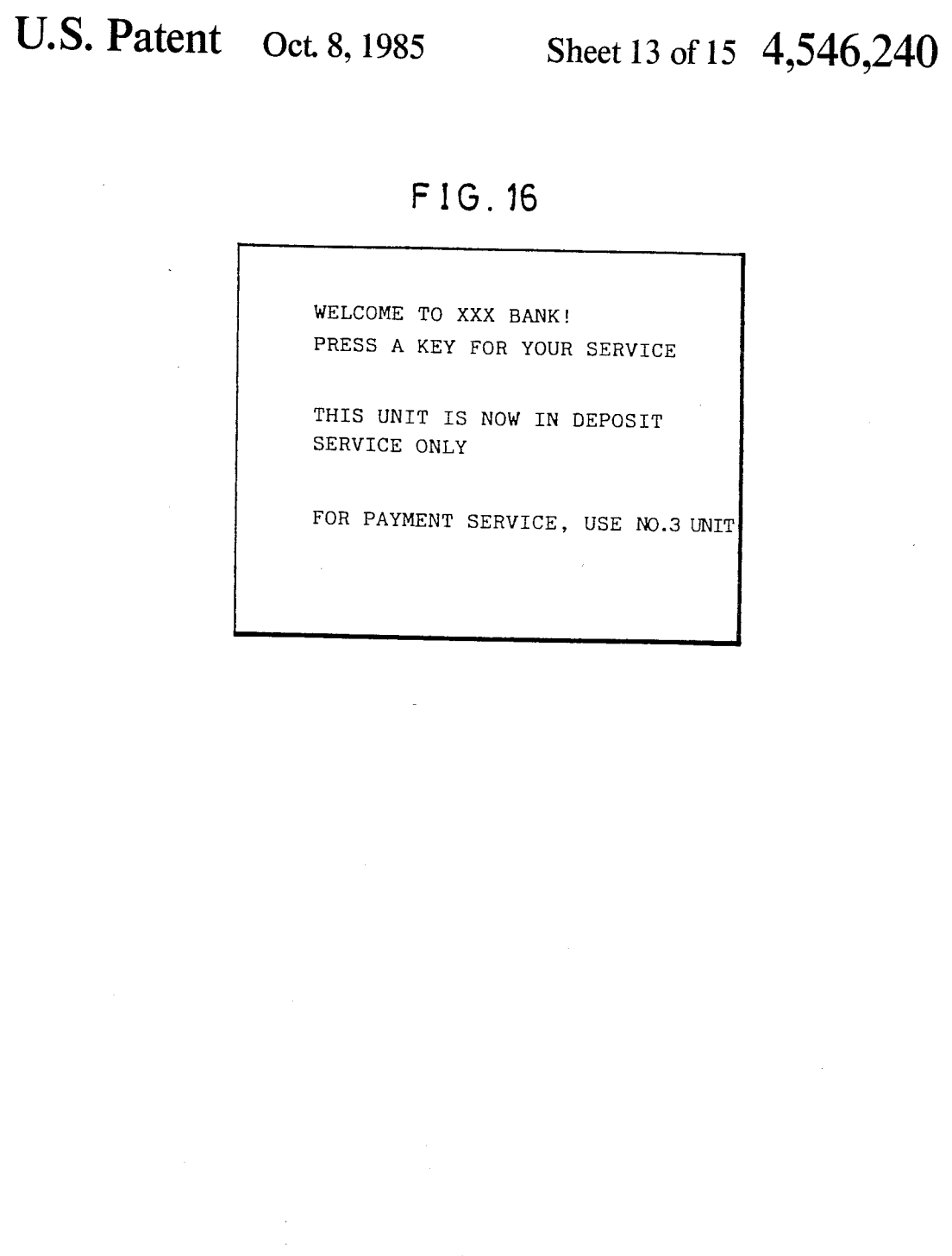

FIG. 16 shows an example of such display. For instance, the CRT 2 of No. 1 unit 1 shows a message to the effect that the customer should select the desired transaction with use of the function buttons 11 to 16 and, in addition, shows that the unit is in deposit service only but that No. 3 unit is in condition for payment transactions. Preferably such instructions should be given not only on the CRT 2 but also on another display installed at a location where it is visible at a distance away therefrom. Such a display showing the operation mode of another terminal unit manifestly tells the customer which unit is available for his desired transaction.

The transaction mode of each terminal unit 1 is transmitted to the centralized monitor-control unit 10 and stored in its RAM 81. Through a communication with a particular terminal unit, the unit 10 transmits to the terminal unit the transaction modes of all the terminals in the system or in the group to which the particular terminal belongs. The terminal unit 1 gives the above display with reference to the transaction data of other terminal units forwarded from the monitor-control unit 10.

With reference to FIG. 10, when the terminal unit concerned is in the receiving-only mode (YES for step 135), the customer will specify a deposit service (YES for step 137) for the unit to perform the deposit service. However, if a payment service is selected (NO for step 137), the sequence returns to the start. Thus if the customer should select an impossible transaction without knowing that the unit is in the receiving-only mode, i.e., without reference to the mode indicated by the pilot lamps 19*a*, 19*b*, the customer will be embarrassed at finding the unit performing no action, being unaware of the cause. He might think that the unit has developed a trouble. This would reduce the reliability of the transaction system, or the clerk would be burdened if he is called for every time such an incident occurs. This is also the case with the process shown in FIG. 15. Accordingly it is desired that when an impossible transaction is selected whereas the terminal unit is in only one transaction mode for deposits or payments, the customer be informed of the fact that the selected transaction is not available, by a display.

Figure 17:
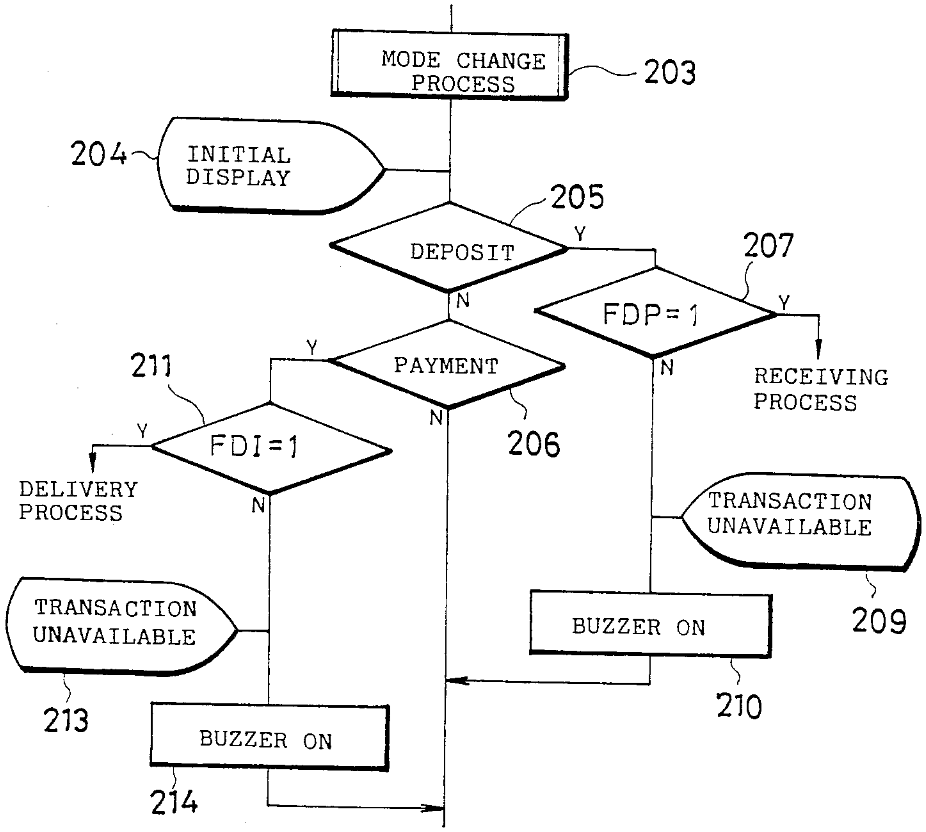
FIG. 17 is a flow chart showing a process for indicating the mode of transaction after a particular kind of transaction has been selected at the terminal.
Figure 18:
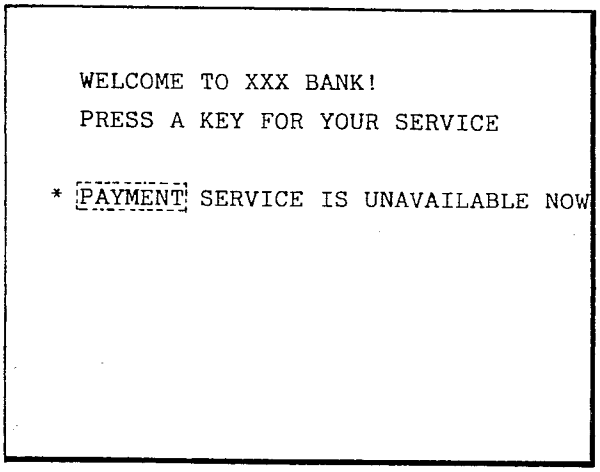
FIG. 18 and FIG. 19 show examples of a display on the CRT of the terminal.

FIG. 17 shows such a procedure. On completion of the mode change process described already (step 203), an initial display is given on the CRT 2 (step 204) for advising the customer to start a transaction. FIG. 18 shows an example of initial display. The initial display is given with reference to the mode flags FDP and FDI in the RAM 22. If the unit is in the receiving-delivery mode, part of the message shown in FIG. 18 is shown. The display reads. "WELCOME TO XXX BANK! PRESS KEY FOR YOUR SERVICE". When the unit is in the receiving-only mode, the display further reads in addition to the two sentences: "PAYMENT SERVICE IS UNAVAILABLE NOW" For the delivery-only mode, the first word of this sentence, i.e., "PAYMENT" is replaced by "DEPOSIT".

Figure 19:
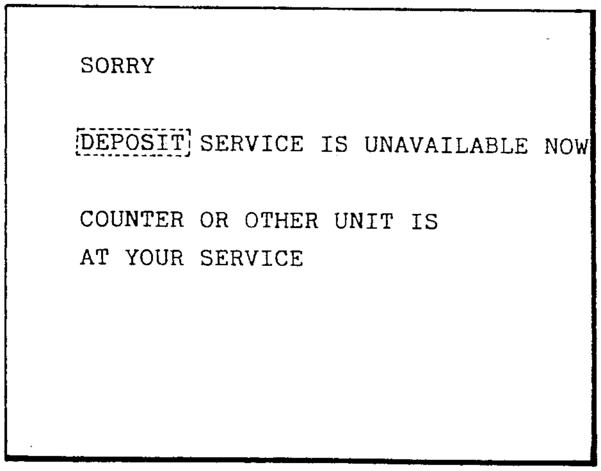

In accordance with the instructions of the initial display on the CRT 2, the customer selects deposit or payment (steps 205, 206), whereupon the sequence proceeds to the specified transaction process. When the deposit transaction is specified, the receiving mode flag FDP is checked as to whether it is 1 or not (step 207). If the flag is 1, the unit is in condition for the deposit transaction, so that the usual receiving process is executed. If the flag FDP is 0, the deposit service is unavailable. A message to this effect is given on the CRT 2 (step 209), and a buzzer (not shown) goes on, for example, for 2 seconds (step 210), telling the customer that the transaction selected is null. FIG. 19 shows an example of display to this effect.

When the payment transaction is specified, the delivery mode flag FDI is checked as to whether it is 1 or not (step 211). If the flag is 1, the unit permits the payment transaction, so that the usual delivery process is executed. If the flag FDI is 0, the payment service is unavailable. A display to this effect is given on the CRT 2 (step 213), and the buzzer goes on (step 214), telling the customer that the transaction selected is null. Step 213 gives the same display as shown in FIG. 19 except that the word "DEPOSIT" which is surrounded by a broken line is replaced by "PAYMENT".

What is claimed is:

1. A system for performing money handling transactions comprising:

a plurality of terminal units, each including at least a cash handling device comprising: a plurality of cash containers for respective money denominations, means for circulating cash into and out of said containers, and means for detecting the amount of cash in each of said containers; each of said terminal units including means enabling it to act in one of a cash receiving-delivering transaction mode, a cash receiving-only transaction mode and a cash delivery-only transaction mode; and means for controlling selection of a transaction mode in which each said terminal unit acts in accordance with the amount of cash contained in the cash handling device of at least one of the other terminal units, said controlling means changing the transaction mode of at least one of said terminal units from a receiving-delivery mode to a receiving-only mode when the amount of cash in at least one of the other terminal units has increased to a predetermined level.

2. A system as defined in claim 1 further comprising a display located in each terminal unit for displaying the transaction mode of the terminal unit.

3. A system as defined in claim 1 wherein the plurality of terminal units are divided into at least two groups, and said controlling means operates such that the transaction mode of one of the terminal units is controlled according to the amount of cash in another terminal unit in the same group as said one unit.

4. A system for performing money handling transations comprising:

a plurality of terminal units, each including at least a cash handling device comprisng: a plurality of cash containers for respective money denominations, means for circulating cash into and out of said containers, and means for detecting the amount of cash in each of said containers; each of said terminal units including means enabling it to act in one of a cash receiving-delivering transaction mode, a cash receiving-only transaction mode and a cash delivery-only transation mode; and means for controlling selection of a transaction mode in which each said terminal unit acts in accordance with the amount of cash contained in the cash handling device of at least one of the other terminal units, said controlling means changing the transaction mode of at least one of said terminal units from a receiving-delivery mode to a delivery-only mode when the amount of cash in at least one of the other terminal units is reduced to a predetermined value.

5. A system as defined in claim 4 further comprising a display located at each terminal unit for displaying the transaction mode of the terminal unit.

6. A system as defined in claim 4 wherein the plurality of terminal units are divided into at least two groups, and said controlling means operates such that the transaction mode of one of the terminal units is controlled according to the amount of cash in another terminal unit in the same group as said one unit.

7. A system for performing money handling transations comprising:

a plurality of terminal units, each including at least a cash handling device comprising: a plurality of cash containers for respective money denominations, means for circulating cash into and out of said containers, and means for detecting the amount of cash in each of said containers; each of said terminal units including means enabling it to act in one of a cash receiving-delivering transaction mode, a cash receiving-only transaction mode and a cash delivery-only transation mode; and means for changing the transaction mode of at least one of said terminal units among said cash receiving-delivering transaction mode, said cash receiving-only transaction mode and said cash-delivery only transaction mode in accordance with the amount of cash present in at least one of the other terminal units.

8. A system as defined in claim 7 further comprising a display located at each terminal unit for displaying the transaction mode of the terminal unit.

9. A system as defined in claim 7 wherein the plurality of terminal units are divided into at least two groups, and said controlling means operates such that the transaction mode of one of the terminal units is controlled according to the amount of cash in another terminal unit in the same group as said one unit.

10. A system as defined in claim 7 wherein at least one of said terminal units contains means responsive to a predetermined mode signal from said controling means for determining, independently of said controlling means, which of the receiving-delivery transaction mode, the receiving-only transaction mode and the delivery-only transaction mode said terminal unit assumes.

* * * * *